United States Patent [19]

Harlan

[11] 3,906,806

[45] Sept. 23, 1975

[54] PUSHBUTTON RADIO RECEIVER INCLUDING AN IMPROVED MANUAL TUNING SHAFT COUPLING AND DECOUPLING ASSEMBLY

[75] Inventor: Alfred R. Harlan, Garland, Tex.

[73] Assignee: Motorola, Inc., Chicago, Ill.

[22] Filed: Jan. 9, 1974

[21] Appl. No.: 432,016

[52] U.S. Cl. ............. 74/10.33; 74/10.27; 74/10.35; 334/7; 192/70.16; 64/30 C

[51] Int. Cl. ............................................ F16h 35/18

[58] Field of Search ............ 74/10.33, 10.31, 10.35, 74/10.27, 10.29, 10.37, 10.8; 334/7; 192/70.28, 89 B, 70.16; 64/30 C, 30 R

[56] References Cited

UNITED STATES PATENTS

| | | | |
|---|---|---|---|
| 2,811,045 | 10/1957 | Thompson | 74/10.33 |
| 2,967,431 | 1/1961 | Beracqua | 74/10.27 |
| 2,996,925 | 8/1961 | Stamm | 74/10.33 |
| 3,238,796 | 3/1966 | Goffstein | 74/10.27 |
| 3,657,932 | 4/1972 | Walsh | 74/10.33 |

*Primary Examiner*—Samuel Scott
*Assistant Examiner*—Randall Heald
*Attorney, Agent, or Firm*—James W. Gillman; Donald J. Lisa

[57] ABSTRACT

A manual tuning shaft and treadle bar drive shaft coupling and decoupling mechanism in a pushbutton radio tuner includes a one piece manual tuning shaft and a crown gear mounted on the drive shaft for rotation thereon. A pinion gear on the tuning shaft engages the crown gear to drive the latter rotatably on the drive shaft. The crown gear includes a high friction clutch surface. A second high friction clutch member is also mounted on the drive shaft for rotation thereon and a flexible metal disc is mounted on and attached to the drive shaft for rotation therewith. The disc is located between the crown gear and second clutch member. A declutch bar of the tuner engages the second clutch member and biases the latter into engagement with the flexible disc forcing the disc into driving engagement with the high friction surface of the crown gear. Rotation of the manual tuning shaft then rotates the drive shaft. Movement of the declutch bar against the biasing force upon depression of a pushbutton in the radio tuner disengages the clutch member, flexible disc and crown gear to decouple the manual tuning and drive shafts.

7 Claims, 4 Drawing Figures

PUSHBUTTON RADIO RECEIVER INCLUDING AN IMPROVED MANUAL TUNING SHAFT COUPLING AND DECOUPLING ASSEMBLY

BACKGROUND

This invention relates generally to pushbutton type radio tuners, such as, for example, those found in motor vehicles and more particularly to the mechanism for declutching the manual tuning shaft upon depression of one of the pushbuttons of the tuner.

Conventionally, in pushbutton type radio tuners of the kind used in radio receivers designed for installation in motor vehicles, there is provided a plurality of stationary tuning coils and a similar number of tuning cores which are movable with respect to the coils to change the frequency received by the radio receiver.

A treadle bar arrangement coupled to the movable cores is commonly employed to move the latter as described upon depression of one of the several pushbuttons of the radio receiver or upon rotating a manual tuner shaft provided therein.

In the above described radio receiver, however, if provisions were not made to disengage the manual tuner shaft from the treadle bar during depression of a pushbutton of the radio receiver, the tuner shaft would be rotated as well. This is undesirable because of the added drag on the mechanism which could cause mistuning and because of the possibility of interference with the tuning also if the manual tuner shaft were inadvertently engaged while a pushbutton was being depressed.

Consequently, in substantially all radio receivers of the above described type, a declutch arrangement has been provided which decouples the manual tuning shaft when a pushbutton is depressed. These arrangements usually include a crown gear which is mounted on a rotatable drive shaft coupled to the treadle bar through intermeshing gear members and a disc type friction clutch, one half of which is coupled to the crown gear and the other half of which is coupled to the rotatable shaft for rotation therewith.

The manual tuning shaft is coupled to the crown gear through a pinion connected to the former. Rotation of the manual tuning shaft imparts rotation to the crown gear to in turn rotate the rotatable drive shaft. A declutch bar moves the crown gear along the shaft to decouple the friction clutch halves upon depression of the pushbutton to decouple the manual tuning shaft from the rotatable drive shaft.

The arrangement described is complex in that a universal joint assembly must be provided in the manual tuning shaft to permit movement of the pinion with the crown gear when the latter is moved along the drive shaft upon depression of the pushbutton of the receiver. A special bracket for mounting the end of the rotatable drive shaft is also required. Furthermore, assembling the arrangement in the radio tuner portion of the receiver is often difficult and time consuming. In addition, backlash often occurs with the complex arrangement which may tend to mistune the radio receiver.

SUMMARY

Accordingly, it is a primary object of the present invention to provide a new and improved declutch arrangement for decoupling the manual tuning shaft in a pushbutton radio receiver upon depression of one of the pushbuttons provided therein.

It is another object of the present invention to provide an arrangement of the above described type which includes fewer and less complex parts than in presently used declutch arrangements, which is relatively simple to assemble in a short time and which has reduced backlash.

It is still another object of the present invention to provide a declutch mechanism of the above described type which is relatively inexpensive to produce and which reduces the cost of the radio receiver in which it is employed.

Briefly, the declutch arrangement of the present invention includes a rotatable drive shaft mounted adjacent a treadle bar assembly in the radio tuner portion of a pushbutton radio receiver. A gear on one end of the drive shaft is in meshing engagement with a fan gear coupled to the treadle bar assembly. At the opposite end of the rotatable drive shaft there is provided one half of a friction disc clutch mounted for rotation about the drive shaft. Mounted adjacent the last-mentioned disc clutch half for rotation with the drive shaft is a circular, flexible metal diaphragm. A crown gear which includes the other half of the friction disc clutch is mounted on the rotatable drive shaft also for rotation thereabout. The metal diaphragm is sandwiched between the friction disc clutch halves. A coil spring is placed over the drive shaft between the metal diaphragm and crown gear to bias the latter normally away from the diaphragm. A one piece manual tuner shaft extends into the radio receiver and includes a pinion gear in meshing engagement with the crown gear. Engagement by the pinion gear urges the friction disc half on the crown gear toward the metal diaphragm against the force of the coil spring and a spring biased declutch bar positioned for engagement by the pushbuttons for movement thereby, engages the other friction disc half to bias the latter normally toward the metal diaphragm. In this condition, when no pushbutton is depressed, the force of the declutch bar causes the friction clutch halves to impart a rotatable force to the metal diaphragm sandwiched therebetween to in turn impart rotation to the rotatable drive shaft which drives the treadle bar in accordance with the rotation of the manual tuning shaft. Depression of a pushbutton, moves the declutch bar to release the biasing force provided thereby against the friction clutch disc halves. The elimination of the last-mentioned force releases the crown gear from driving engagement with the metal diaphragm to prevent rotation of the manual tuning shaft during movement of the treadle bar assembly resulting from the depression of a pushbutton.

DETAILED DESCRIPTION

Figure 1:
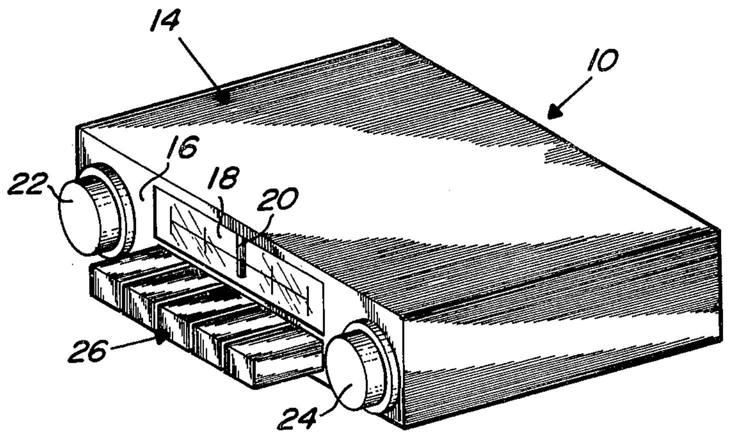
FIG. 1 is a perspective view of a pushbutton type radio receiver including an improved manual tuner shaft declutch assembly according to the invention.

Referring now to the drawings in greater detail wherein like numerals have been employed throughout the various views to designate similar components, there is shown in FIG. 1 a radio receiver designated generally by the numeral 10, designed for use in an automobile or the like vehicle. The radio receiver includes a tuner portion 12 shown in FIGS. 2–4 and radio circuitry (not shown) mounted within an outer housing 14. A front wall or bezel 16 of the housing includes a dial scale 18 and movable pointer 20 for indicating the radio frequency to which the receiver is tuned. Also provided on the front bezel 16 are tuning knobs such as 22, 24, for controlling volume and the on/off condition of the radio (22) as well as for manually selecting the radio frequency to which the radio receiver is tuned (24). A plurality of pushbuttons 26 extend from the front bezel 16 below the dial scale 18 and are provided for tuning the receiver to radio frequencies which have been preselected.

The tuner portion 12 of the radio receiver includes a metal mounting bracket 28 which is rectangular in shape. The bracket is formed from a U-shaped member 30 bent to provide a rear wall 32 and side walls 34, 36. A separate front wall 38 is fastened to the side walls 34, 36 by means of bolts such as 40. The bracket is attached by suitable fasteners (not shown) to the front bezel at front wall 38 of the bracket.

The tuner portion 12 is provided with the usual tuning assembly 42. The assembly includes a plurality of stationary tuning coils such as 44 mounted on bracket 28 and a similar number of tuning cores, such as 46, movable with respect to the coils to change the frequency received by the radio receiver. The movable tuning cores are all connected at one end 48 to a core carriage 50. The core carriage 50 is mounted for sliding movement between the side walls 34, 36 of the tuner mounting bracket 28. Ends such as 52 (FIG. 4) of the core carriage extends through slots such as 54 in the side walls of the bracket 28 to mount the carriage for movement.

A conventional treadle bar assembly 56 including a pair of parallel bars 58, 60 mounted at the ends thereof on support members 62, 64 is also provided in the tuner portion 12. The support members are pivotally mounted to the side walls 34, 36, respectively, of the tuner portion 12 for rotation. As can be seen at one side wall 36, an adjustment screw 66 is utilized to change the force holding the treadle bar in its mounted position between walls 34, 36. The support member 62 includes a fan gear 68 which is in meshing engagement with a pinion gear 70 mounted for rotation on a rotatable drive shaft 72 extending between walls 34, 36 of the mounting bracket 28. Bearing members 74, 76 in each of the walls 34, 36, respectively, are provided for mounting the drive shaft 72.

One end 78 of the drive shaft 72 extends beyond the wall 36 of the bracket 28 for accommodating the manual drive gears and clutch plates required for manual and pushbutton tuning in the radio tuning portion 12.

Mounted on the outwardly extending end 78 of drive shaft 72 is a flexible, diaphragm disc 80, preferably stamped from a thin sheet of metal, such as for example, brass or the like. The flexible diaphragm disc is mounted at its center for rotation with drive shaft 72 and is the only element of the manual drive and declutch mechanism which is attached to the drive shaft for movement therewith. The flexible disc includes radially extending arms 93 which extend from a central hub 85 to an outer rim or ring portion 97. The structure provides added flexibility to the disc.

Also mounted on end 78 of the drive shaft 72 for rotation thereabout is a clutch member 82. The clutch member 82 is mounted between the diaphragm disc and the wall 36 of the tuner bracket 28. The clutch member 82 is circular and cymbal-shaped, having an outer rim portion 84 facing the metal diaphragm disc 80. A high friction, preferably rubber, ring 86 is bonded to the rim 84 of the clutch member 82 and serves as one half of the clutch assembly of the mechanism. A necked-down or collar portion 95 of the clutch member 82 includes a circumferential recess 87 formed therein. The recess, as will be explained in greater detail hereinafter, receives a protruding finger-like portion 89 of a declutch bar provided in the radio tuner portion.

The other half of the clutch assembly is provided by crown gear 88 also mounted on end 78 of the drive shaft 72 for rotation thereabout. The crown gear has, along one rim, gear teeth 90 and along the opposite rim 92, a high friction, preferably rubber, ring 94 bonded thereto. The crown gear is mounted on shaft 72 with the rubber friction ring 94 facing the metal diaphragm 80 on the opposite side thereof from clutch member 82. A small coil spring 96 also received on drive shaft 72 engages the crown gear 88 and metal diaphragm 80 near the centers thereof and provides a weak force to normally separate the crown gear and diaphragm.

The one piece manual tuning shaft 98 of the tuner portion is received in a mounting bearing 100 formed with the front bezel of the tuner portion. A bracket 102 extending from and attached to a mounting post 104 in the tuner portion at the rear of bezel 16, provides support for the inwardly extending end 106 of the manual tuner shaft 98. The manual tuner shaft extends substantially perpendicular to the drive shaft 72 and a pinion gear 108 on end 106 of the last-mentioned shaft is provided for driving engagement with the teeth 90 of crown gear 88.

Assembly of the above described elements of the manual tuner shaft and declutch mechanism is rather simple. To accomplish the latter, the clutch member 82 is merely received on the drive shaft 72 from the end thereof opposite end 78 prior to insertion of the shaft into bearings 76, 74. Thereafter, the shaft is placed in position in the tuner portion with end 78 extending outwardly therefrom at wall 36 of bracket 28.

The coil spring 96 and crown gear 88 are received on shaft 72 from the free end 78 thereof. No critical alignment or the like of the latter on shaft 72 is necessary. To maintain gear 88 on the shaft in proper relation with respect to metal drive diaphragm 80, the one piece manual tuner shaft 98 is inserted through bezel bracket 100 and support bracket 102 so that gear 108 engages teeth 90 of the crown gear. The weak spring 96 provides the proper force against the crown gear to cause the pinion 108 of the manual tuning shaft to engage the gear teeth 90 of the crown gear. The proper location of the manual tuning shaft, the metal diaphragm 80 and the coil spring 96 place all the elements in correct relation with respect to each other.

Figure 3:
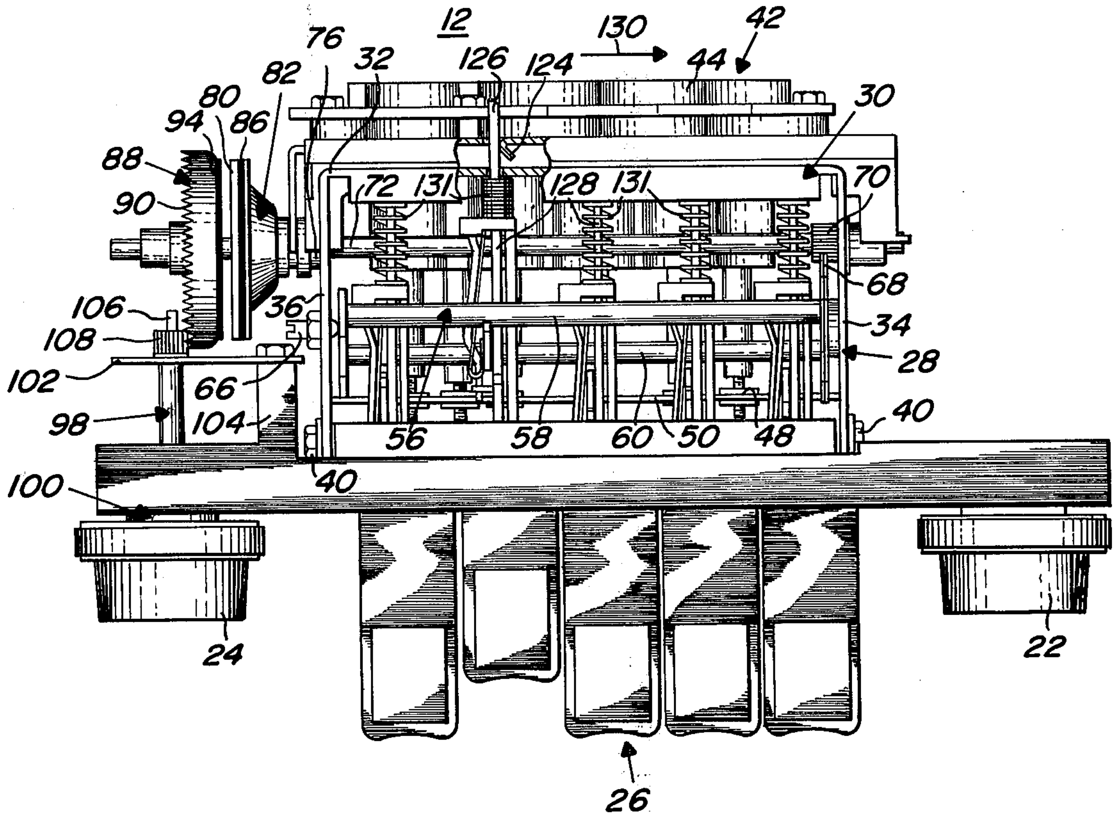
Figure 4:
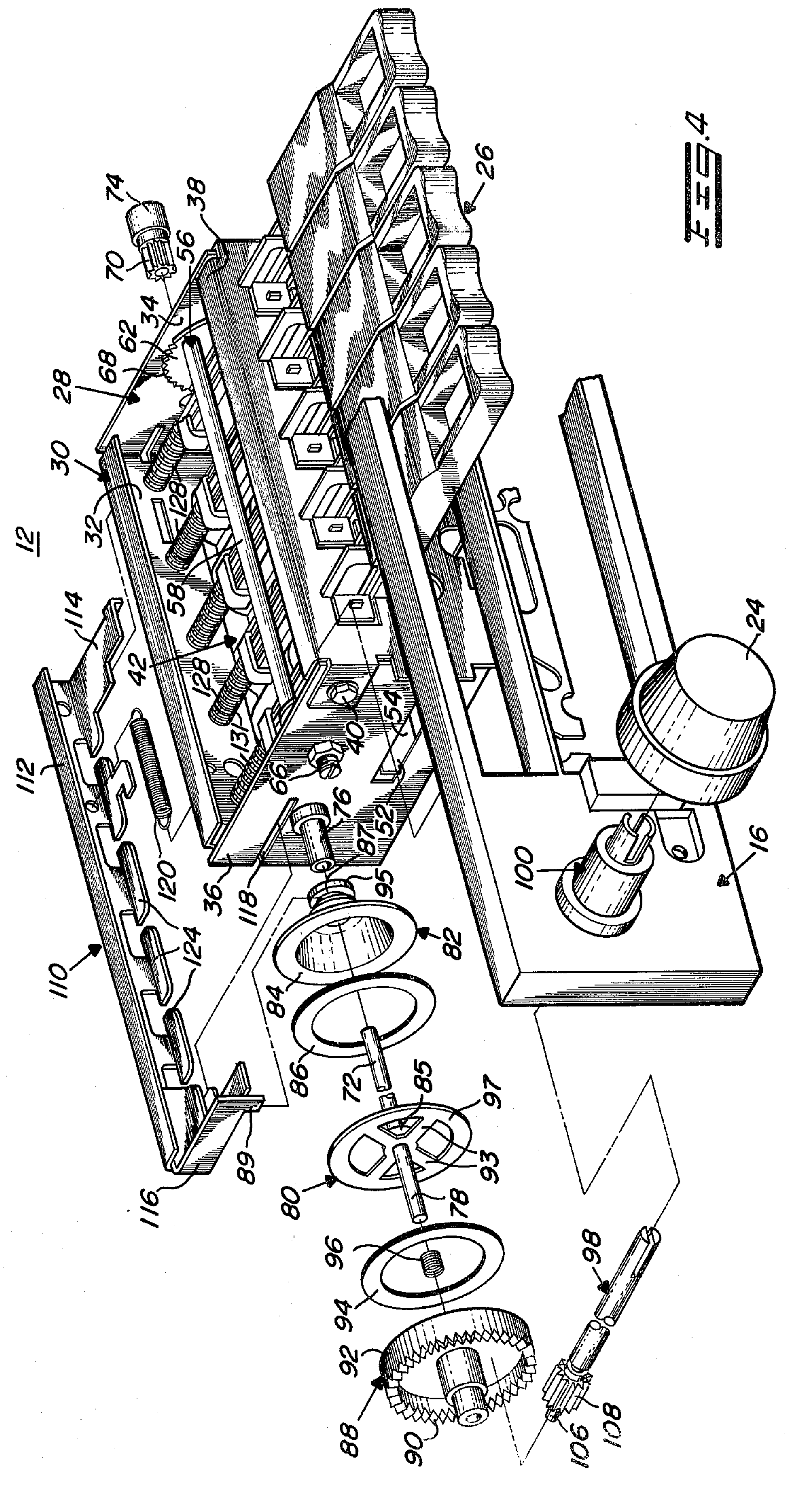
FIG. 4 is an exploded, perspective view of the tuner portion of FIGS. 2 and 3.

As mentioned heretofore, a declutch bar is provided in tuner portion 12. The declutch bar 110 is of the conventional type including an elongated member 112 extending the length of rear wall 32 and including inwardly extending arm portions 114, used for mounting the bar 110 to the bracket 28 in slots, such as 118 provided in walls 32, 34 and 36 (FIG. 4). The bar is mounted for sliding movement along rear wall 32 toward and away from the wall 36 of the tuner portion. A spring 120 is attached to the bar 110 and to a stationary post (not shown) on the bracket 28 to bias the bar in the direction of arrow 122 (See FIG. 2). Cam members 124 are provided on the declutch bar 110 and are positioned for engagement therebetween by the end 126 (See FIG. 3) of key slide assemblies 128 coupled to the pushbuttons 26 of the tuner portion. Depression of a pushbutton as shown in FIG. 3 causes the end 126 thereof to be inserted between a pair of spaced cams 124 which are normally placed slightly offset with respect to the key slide end. Engagement of the cams 124 by the end 126 of the key slide, moves the declutch bar in the direction of arrow 130 (See FIG. 3).

As mentioned heretofore, a fingerlike protrusion 89 of declutch bar 110 is received in the circumferential recess 87 in the neck portion 85 of declutch member 82. Thus, movement of the declutch bar 110 as described likewise moves the member 82 in the direction of arrow 130 along shaft 72 away from the metal diaphragm 80 to disengage the friction disc 86 therefrom.

In normal operation, the spring 120 biasing declutch bar 110 in the direction of arrow 122 maintains clutch member 82 in driving engagement with metal diaphragm 80 and because the latter is flexible, in driving engagement with the friction ring 94 of crown gear 88. Consequently, rotation of tuning knob 24 to rotate manual tuning shaft 98 imparts rotation to drive shaft 72 through the clutch assembly. Rotation of the drive shaft drives the treadle bar to reposition tuning cores 46 with respect to the stationary tuning coils 42 to adjust the frequency received by the radio receiver.

Upon depression of a pushbutton (See FIG. 3) the end 126 of the associated key slide 128 engages the declutch bar, moving it in the direction of arrow 130. The declutch bar 110 in turn moves clutch member 82 in the same direction, separating the high friction ring 86 thereof from flexible diaphragm disc 80. The removal of force against the flexible disc 80 provided by the declutch bar through clutch member 82, causes the flexible disc to be separated from the high friction ring 94 of crown gear 88. Thus, any rotation of manual tuning knob 24 at this time will merely rotate crown gear 88 about drive shaft 72 with no affect thereon.

Figure 2:
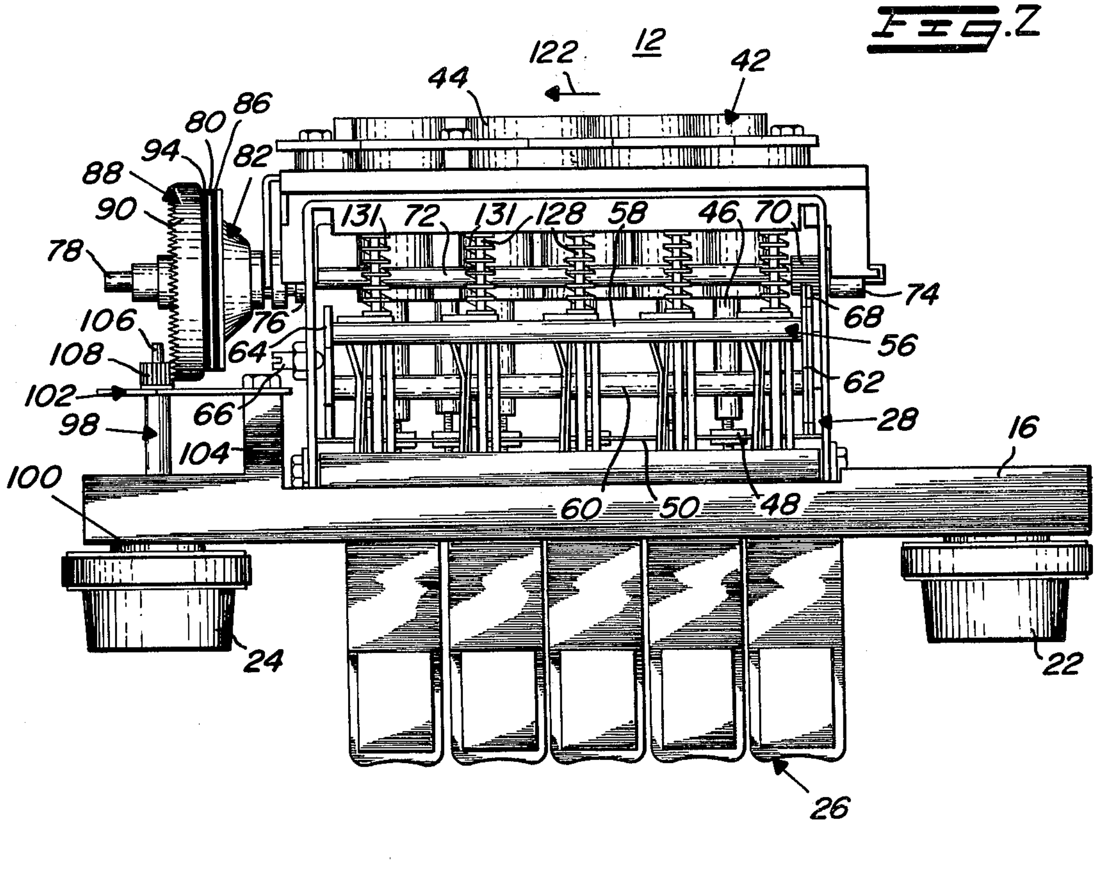
FIGS. 2 and 3 are bottom, plan views of the tuner portion of the radio receiver of FIG. 1 illustrating in detail the manual tuner shaft declutch assembly as it appears both when no pushbutton is depressed and when a pushbutton is depressed.

Release of the pushbutton 26 permits it to be returned to an extended position (FIG. 2). The pushbutton is returned by a coil spring, such as 131, surrounding the key slide end 126. The release of the pushbutton permits spring 120 to return the declutch bar 110 to its normal position whereby clutch member 82 is also returned to its normal position on shaft 72. When the latter occurs, the clutch member 82 engages the flexible diaphragm disc 80 causing the latter to be tightly sandwiched between the rubber clutch rings 86 and 94. Thereafter, rotation of knob 24 imparts rotation to shaft 72 through crown gear 88, clutch member 82, the associated friction clutch halves and the flexible metal diaphragm disc 80 attached to the shaft 72.

The declutch assembly according to the invention is relatively simple in construction, yet reliable in operation. In addition, it is easy to assemble requiring no special alignment, etc., of the crown gear 88 or clutch member 82 which are loosely mounted on drive shaft 72.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A pushbutton radio receiver including a tuner portion having a plurality of stationary tuning coils mounted therein, a plurality of tuning cores mounted for movement with respect to said coils for changing the frequency received by said radio receiver, a plurality of pushbuttons mounted in said tuner portion and being manually depressible, means coupling said pushbuttons and said cores for movement of the latter to predetermined positions with respect to said coils in response to the depression of said pushbuttons, manual tuning means including a rotatable tuning shaft for moving said cores with respect to said coils to alter the frequency received by said radio receiver in response to the rotation of said manual tuning shaft, a drive shaft mounted for rotation in said tuner portion, coupling means for coupling said manual tuning shaft and drive shaft, said drive shaft being rotatable thereby in response to the rotation of said manual tuning shaft and being coupled to said cores for moving the latter with respect to said coils in response to the rotation of said drive shaft, said coupling means including first and second clutch discs mounted on said drive shaft for rotation thereabout, said first clutch disc being coupled to said manual tuning shaft and rotatable on said drive shaft in response to the rotation of said manual tuning shaft, a flexible drive disc mounted on and attached to said drive shaft for rotation therewith, said first and second clutch discs being on opposite sides of said drive disc on said rotatable drive shaft and being normally urged into driving engagement therewith for imparting rotational force thereto in response to the rotation of said manual tuning shaft for altering the frequency received by said radio receiver and declutch means movable between a first and second position by the depression of one of said pushbuttons, said declutch means being coupled to said shaft coupling means and disengaging said clutch discs with respect to said flexible drive disc in response to the depression of said pushbutton to decouple said manual tuning shaft while said pushbutton is depressed.

2. A pushsbutton radio receiver as claimed in claim 1 wherein said flexible disc is connected fixedly at the center thereof to said drive shaft and is flexible at the periphery thereof, and wherein said declutch means is mounted for engagement with said second clutch disc and is resiliently biased into said first position, whereby said declutch means provides the necessary force against said second clutch disc to move the latter into engagement with said flexible disc thereby moving said first and second clutch discs into frictional engagement with said flexible disc.

3. A pushbutton radio receiver as claimed in claim 2 wherein said first clutch disc includes a crown gear mounted for rotation on and about said drive shaft, one surface of said crown gear including high friction material for engagement with said flexible disc, wherein said second clutch disc also includes a high friction materail on one surface thereof for engagement with said flexible disc and on the opposite surface thereof, a necked-down portion having a circumferential reces formed therein and wherein said declutch means includes a projection extending into said circumferential recess, whereby movement of said declutch means imparts movement to said second clutch disc along said drive shaft.

4. A pushbutton radio receiver as claimed in claim 3 wherein said manual tuning shaft is of a one-piece construction and mounted in said tuner portion at a predetermined location and wherein said manual tuning shaft includes gear means at the free end thereof positioned for driving engagement with said crown gear, whereby upon rotation of said tuning shaft, said crown gear is rotated on said drive shaft.

5. A pushbutton radio receiver including a tuner chassis having a plurality of stationary tuning coils mounted therein, a plurality of tuning cores mounted for movement with respect to said coils for altering the frequency received by said radio receiver, a plurality of pushbuttons mounted in said chassis and movable by manual depression thereof, means coupling said pushbuttons and cores for moving the latter to preselected positions with respect to said coils upon depression of predetermined ones of said pushbuttons, manual tuning means including a manually rotatable tuning shaft and a rotatable drive shaft, means coupling said shafts for rotation of the drive shaft in response to the rotation of said manual tuning shaft, said drive shaft being coupled to said pushbutton and core coupling means for moving the latter to in turn move said cores with respect to said tuning coils in response to the rotation of said manual tuning shaft and declutch means including a declutch member movable between first and second positions and being resiliently biased into said first position, said declutch member being movable from said first to said second position upon depression of one of said plurality of pushbuttons to disengage said shaft coupling means thereby preventing movement of said drive shaft by said manual tuning shaft while said pushbutton is depressed, said shaft coupling means including first and second clutch members mounted on said rotatable drive shaft for rotation thereon, said second clutch member including means for engaging said manual tuning shaft and a flexible disc member mounted on and attached to said rotatable drive shaft for rotation therewith, said flexible disc member being mounted between said clutch members, said declutch member normally engaging said first clutch member to urge the latter into engagement with said flexible disc member, whereby the latter is held tightly between said first and second clutch members so that rotation of said manual tuning shaft is imparted therethrough to drive said drive shaft rotatably, said declutch member disengaging said first clutch member from said flexible disc member upon depression of one of said pushbuttons to decouple said first and second clutch members and said flexible disc thereby preventing rotation of said rotatable drive shaft by said manual tuning shaft while said pushbutton is depressed.

6. A pushbutton radio receiver as claimed in claim 5 wherein said tuner chassis further includes resilient biasing means for biasing said declutch member into said first position, said biasing means providing the force necessary to maintain said clutch members in engagement with said flexible disc and wherein said declutch member includes cam means positioned for engagement with said pushbuttons upon depression thereof for driving said declutch means from said first to said second position thereby decoupling said clutch members and said flexible disc.

7. A pushbutton radio receiver as claimed in claim 5 wherein said second clutch member includes a circular gear member mounted on said drive shaft for rotation thereon, said gear member including on a first surface thereof a high friction material for engagement with said flexible disc member and wherein said first clutch member includes a disc member mounted on said drive shaft having on a first surface thereof a high friction material for engagement with said flexible disc member, said first and second clutch members normally being urged into frictional engagement with said flexible disc member for driving the latter and said rotatable shaft upon rotation of said second clutch member, and wherein said manual tuning shaft includes gear means at a free end thereof positioned for engagement with the circular gear member of said second clutch member whereby upon rotation of said manual tuning shaft said second clutch member is rotated on said drive shaft.

* * * * *